(12) United States Patent
Zhang et al.

(10) Patent No.: US 12,507,847 B1
(45) Date of Patent: Dec. 30, 2025

(54) BLOWING-SUCTION MACHINE AND METHOD FOR USING BLOWING-SUCTION MACHINE FOR CLEANING

(71) Applicant: Zhejiang Feihu New Energy Technology Co., Ltd., Jinhua (CN)

(72) Inventors: Feibiao Zhang, Jinhua (CN); Gan Chen, Changzhou (CN); Tengzhuang Lin, Wenzhou (CN)

(73) Assignee: Zhejiang Feihu New Energy Technology Co., Ltd., Jinhua (CN)

( * ) Notice: Subject to any disclaimer, the term of this patent is extended or adjusted under 35 U.S.C. 154(b) by 0 days.

(21) Appl. No.: 19/322,576

(22) Filed: Sep. 8, 2025

(30) Foreign Application Priority Data

Dec. 7, 2024 (CN) .......................... 202411792633.0

(51) Int. Cl.
*A47L 5/24* (2006.01)
*A47L 9/08* (2006.01)

(52) U.S. Cl.
CPC .. *A47L 5/24* (2013.01); *A47L 9/08* (2013.01)

(58) Field of Classification Search
CPC ...................................... A47L 5/24; A47L 9/08
See application file for complete search history.

(56) References Cited

U.S. PATENT DOCUMENTS

| | | | | |
|---|---|---|---|---|
| 4,734,017 A * | 3/1988 | Levin | ..................... | H02K 7/145 D32/15 |
| 5,894,630 A * | 4/1999 | Bitner | ..................... | A47L 5/14 15/330 |
| 6,049,944 A * | 4/2000 | Lopez | ..................... | A47L 5/24 15/350 |
| 6,105,206 A * | 8/2000 | Tokumaru | ..................... | F04D 19/002 15/410 |
| 7,743,683 B2 * | 6/2010 | Dayton | ..................... | B25F 3/00 173/217 |
| 8,024,995 B2 * | 9/2011 | Dayton | ..................... | B25F 3/00 173/217 |

(Continued)

FOREIGN PATENT DOCUMENTS

| | | |
|---|---|---|
| CN | 208563212 U | 3/2019 |
| CN | 215000095 U | 12/2021 |

(Continued)

*Primary Examiner* — Marc Carlson
(74) *Attorney, Agent, or Firm* — Nitin Kaushik

(57) ABSTRACT

The present invention discloses a blowing-suction machine and a method for using a blowing-suction machine for cleaning. The blowing-suction machine includes a blowing-suction machine body, and the blowing-suction machine body includes a handheld handle and an air blowing-suction machine component. An end portion of the handheld handle is provided with a connecting assembly connected to the air blowing-suction machine component, and the air blowing-suction machine component includes an air blowing-suction head assembly and a rotating bracket. A ball block and a fixing rack are disposed in the rotating bracket, and the ball block is internally provided with a plurality of clamping slots. The air blowing-suction head assembly includes a motor cover disposed on one side of the rotating bracket, one side of the motor cover is provided with a ball slot and a motor cover toothed portion connected to the rotating bracket.

11 Claims, 10 Drawing Sheets

(56) References Cited

U.S. PATENT DOCUMENTS

| | | | | |
|---|---|---|---|---|
| 8,793,886 | B2* | 8/2014 | Yamaoka | A01G 3/053 |
| | | | | 30/340 |
| 9,267,291 | B1* | 2/2016 | Ramsey | E04D 13/0765 |
| 10,375,896 | B2* | 8/2019 | Sheffer | B25G 1/04 |
| 11,723,314 | B2* | 8/2023 | Ito | A01G 3/086 |
| | | | | 30/211 |
| 11,905,711 | B2* | 2/2024 | Holman | F04D 19/002 |
| 12,311,520 | B2* | 5/2025 | Wang | A47L 5/14 |
| 2002/0194739 | A1* | 12/2002 | Krane | A01G 3/08 |
| | | | | 30/296.1 |
| 2005/0241161 | A1* | 11/2005 | Doragrip | A01G 3/053 |
| | | | | 30/392 |
| 2007/0000138 | A1* | 1/2007 | Baskar | A01G 3/0417 |
| | | | | 30/392 |
| 2010/0037469 | A1* | 2/2010 | Chubb | A01G 3/053 |
| | | | | 30/216 |
| 2010/0101096 | A1* | 4/2010 | Yamaoka | A01G 3/053 |
| | | | | 30/199 |
| 2010/0126029 | A1* | 5/2010 | Peterson | A01D 34/90 |
| | | | | 29/401.1 |
| 2013/0248216 | A1* | 9/2013 | Tsuchiya | B25F 5/02 |
| | | | | 173/18 |
| 2025/0311900 | A1* | 10/2025 | Conrad | A47L 5/28 |

FOREIGN PATENT DOCUMENTS

| | | | | |
|---|---|---|---|---|
| CN | 219940482 | U | 11/2023 | |
| KR | 102868342 | B1* | 10/2025 | E05F 15/611 |

* cited by examiner

BLOWING-SUCTION MACHINE AND METHOD FOR USING BLOWING-SUCTION MACHINE FOR CLEANING

CROSS-REFERENCE TO RELATED APPLICATIONS

The application claims priority to Chinese patent application No. 2024117926330, filed on Dec. 7, 2024, the entire contents of which are incorporated herein by reference.

TECHNICAL FIELD

The present invention relates to the field of blowing-suction machines, and in particular, to a blowing-suction machine and a method for using a blowing-suction machine for cleaning.

BACKGROUND

As a multi-functional cleaning tool, the blowing-suction machine is widely used in home, commercial, and industrial environments. Traditional blowing-suction machines usually adopt an integrated design, that is, the air blowing tube or the air suction tube is connected to the handheld structure. When using the blowing-suction machine, the user needs to use the power of the wrist to adjust the direction of the air blowing-suction head to achieve the purpose of cleaning. However, the air blowing-suction head cannot rotate flexibly, making it difficult to clean some narrow or hard-to-reach corners, and the cleaning range is limited.

SUMMARY

In view of deficiencies in the prior art, the present invention provides a blowing-suction machine and a method for using a blowing-suction machine for cleaning, so that an air blowing-suction head assembly can flexibly rotate, thereby expanding a cleaning range of the blowing-suction machine; an operation is convenient, thereby improving cleaning efficiency; and various cleaning scenarios can be adapted, thereby meeting diversified requirements of a user.

The present invention adopts the following technical solutions:

A blowing-suction machine, including a blowing-suction machine body, where the blowing-suction machine body includes a handheld handle and an air blowing-suction machine component, an end portion of the handheld handle is provided with a connecting assembly connected to the air blowing-suction machine component, the air blowing-suction machine component includes an air blowing-suction head assembly and a rotating bracket, a ball block and a fixing rack are disposed in the rotating bracket, the ball block is internally provided with a plurality of clamping slots, the air blowing-suction head assembly includes a motor cover disposed on one side of the rotating bracket, one side of the motor cover is provided with a ball slot and a motor cover toothed portion connected to the rotating bracket, a spring is mounted on the ball slot, and a ball clamped in the clamping slot is disposed on the spring.

Preferably, a motor is disposed in the motor cover, an air tube connecting member is disposed on one side of the motor cover, and an air inlet cover is disposed on the other side of the motor cover.

Preferably, two ends of the motor cover are provided with a first motor cover thread and a second motor cover thread, the air inlet cover is internally provided with an inner air inlet cover thread, the first motor cover thread is threadedly connected to the inner air inlet cover thread, two ends of the air tube connecting member are internally provided with a first inner air tube connecting member thread and a second inner air tube connecting member thread, and the first inner air tube connecting member thread is threadedly connected to the second motor cover thread.

Preferably, an air tube is disposed on one side of the air tube connecting member, the air tube is provided with a first air tube thread, and the first air tube thread is threadedly connected to the second inner air tube connecting member thread.

Preferably, one side of the rotating bracket is connected to the motor cover toothed portion by using a bolt to be inserted into the motor cover toothed portion.

Preferably, adjacent clamping slots are arranged at equal intervals along a circumferential direction.

Preferably, the connecting assembly includes a connecting rod and a connecting member, the connecting member configured to lock, fix, and adjust two connecting rods is disposed between the adjacent connecting rods, and the connecting member can be configured to lengthen or shorten the connecting rod.

Preferably, the connecting member includes a male end connector and a female end connector, the male end connector is connected to an end portion of one of the connecting rods through a screw, the female end connector is connected to an end portion of the other adjacent connecting rod through the screw, and a male wire terminal and a female wire terminal that are communicated are disposed in the male end connector and the female end connector respectively.

Preferably, the male end connector is connected to the female end connector through a threaded sleeve.

Preferably, a positioning structure is disposed between the male end connector and the female end connector, the positioning structure includes a positioning block and a positioning slot arranged corresponding to the positioning block, one of the positioning block and the positioning slot is disposed on the male end connector, the other is disposed on the female end connector, and the male end connector and the female end connector are positioned through matching between the positioning block and the positioning slot.

The present invention further provides a method for using a blowing-suction machine for cleaning, adopting the above blowing-suction machine, where the method includes the following steps:

adjusting an angle of an air blowing-suction head assembly through a rotary motor cover;

selecting an air blowing mode or an air suction mode; and using the air blowing-suction head assembly for cleaning.

The present invention has the following beneficial effects:

According to the blowing-suction machine provided by the present invention, rotary rotation of the motor cover can be fixed through the fixing rack disposed in the rotating bracket, and the motor cover is clamped in the clamping slot through the ball disposed on the spring to be connected to the rotating bracket, so that an operator can operate the motor cover and the air blowing-suction head assembly to rotate integrally when pressing the fixing rack to enable the motor cover to rotate, thereby driving the ball to squeeze the spring and to rotate to the clamping slots at different positions on the ball block, thereby clamping the ball in the clamping slots at different positions. Therefore, the air blowing-suction head assembly flexibly rotates, and more narrow or hard-to-reach corners can be cleaned, thereby expanding the cleaning range of the blowing-suction machine; the operation is convenient, thereby improving the cleaning efficiency; and various cleaning scenarios can be adapted, thereby meeting diversified requirements of the user. The motor cover is connected to the rotating bracket through the motor cover toothed portion, and a connection is stable and tight, so that a gap between the motor cover and the rotating bracket is reduced, thereby avoiding swinging during use and improving a cleaning effect and user experience; and a structure is simple and is convenient to assemble, thereby improving production efficiency and reducing a production cost.

The additional advantages of the present invention will be partially presented in the following description, some of which will become apparent from the following description, or learned through practice of the present invention.

BRIEF DESCRIPTION OF THE DRAWINGS

The accompanying drawings described herein are intended for a further understanding of the present invention and constitute a part of the present application. Example embodiments of the present invention and descriptions thereof are intended to explain the present invention, and do not constitute any inappropriate limitation on the present invention. In the accompanying drawings.

Figure 1:
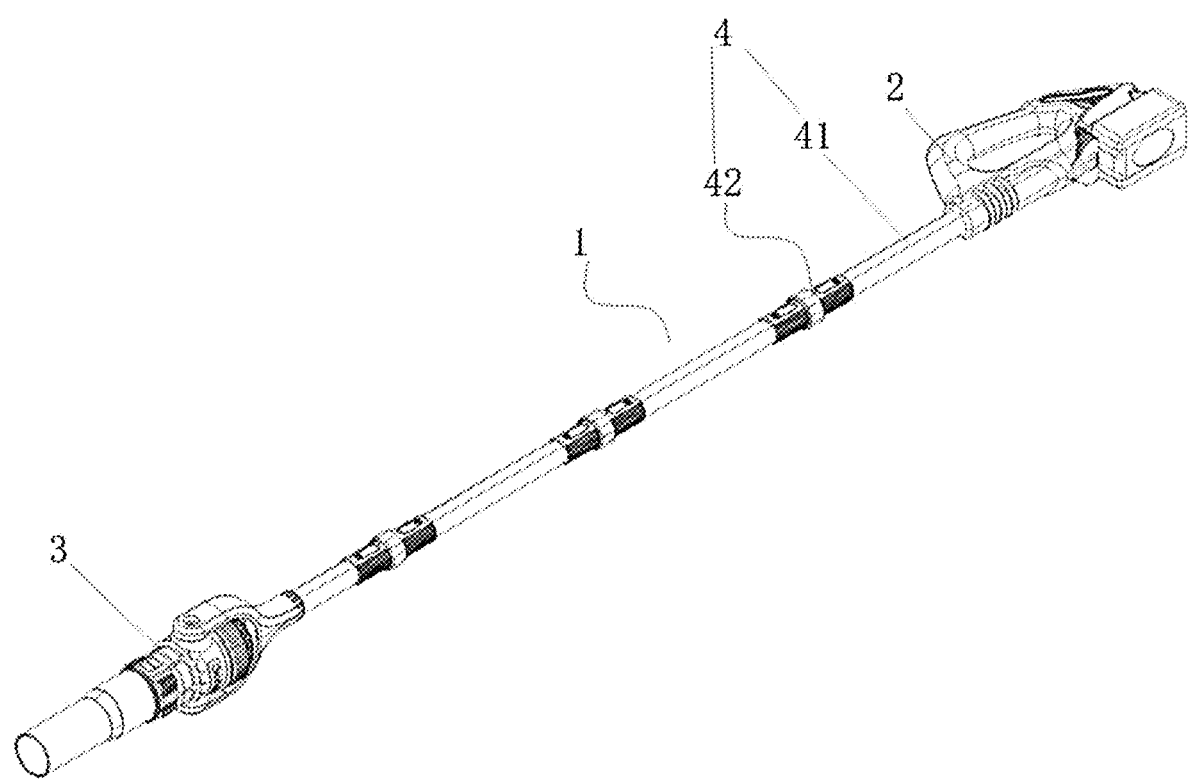
FIG. 1 is a schematic structural diagram of a blowing-suction machine according to an embodiment of the present invention.
Figure 2:
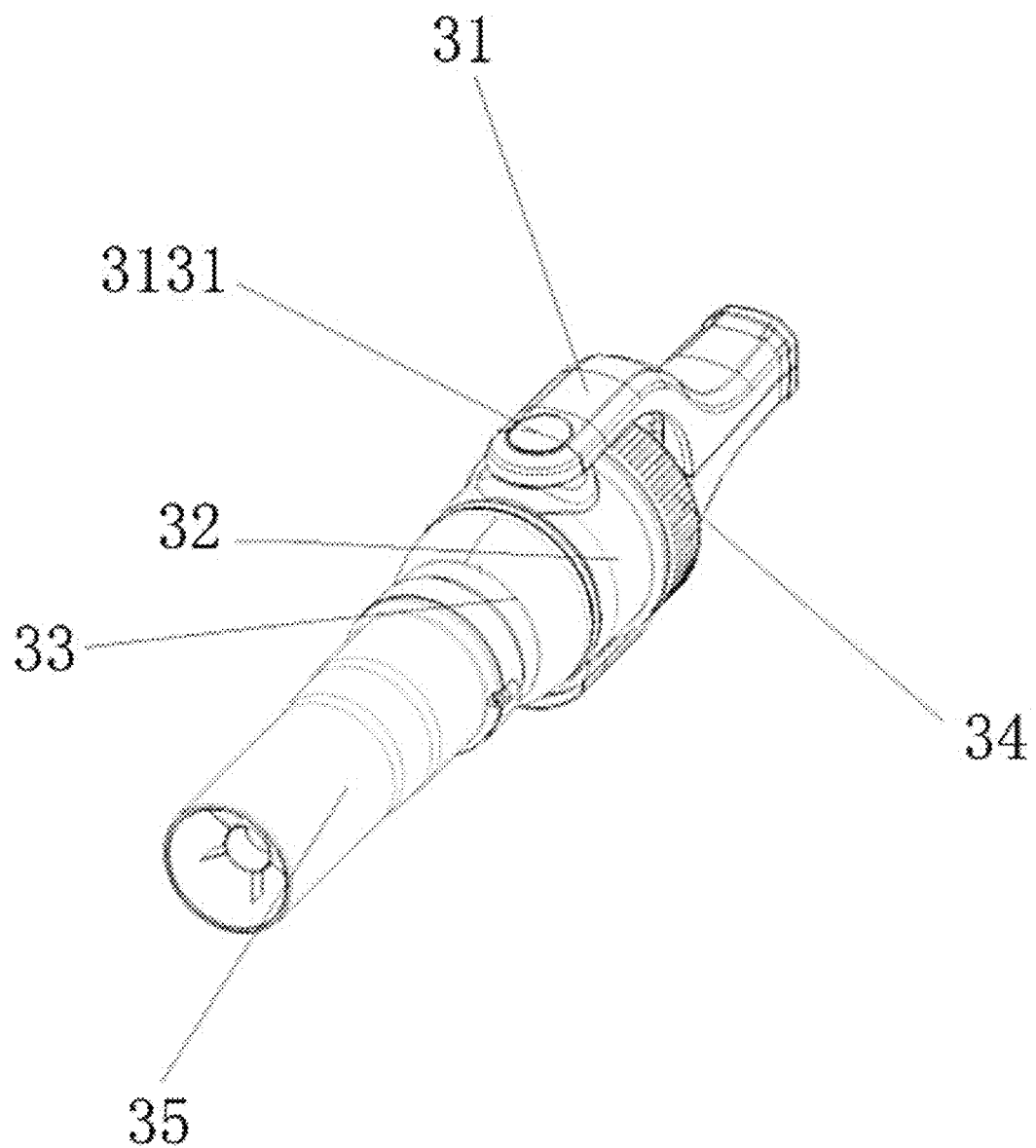
FIG. 2 is a schematic structural diagram of an air blowing-suction machine component according to an embodiment of the present invention.

Reference numerals in the accompanying drawings: blowing-suction machine body 1; handheld handle 2; air blowing-suction machine component 3; rotating bracket 31; ball block 311; clamping slot 3111; fixing rack 312; bolt 313; cover cap 3131; bearing 314; motor cover 32; motor cover toothed portion 321; ball slot 322; spring 323; ball 324; first motor cover thread 325; second motor cover thread 326; air tube connecting member 33; first inner air tube connecting member thread 331; second inner air tube connecting member thread 332; air inlet cover 34; inner air inlet cover thread 341; air tube 35; first air tube thread 351; motor 36; connecting assembly 4; connecting rod 41; connecting member 42; male end connector 421; female end connector 422; threaded sleeve 423; male wire terminal 424; female wire terminal 425; positioning block 426.

DETAILED DESCRIPTION OF THE EMBODIMENTS

To make the purpose, technical solutions, and advantages of the embodiments of the present invention clearer, the following clearly and completely describes the technical solutions of the embodiments of the present invention with reference to the accompanying drawings in the embodiments of the present invention. Apparently, the embodiments described are a part rather than all of the embodiments of the present invention. All other embodiments obtained by those of ordinary skill in the art based on the described embodiments of the present invention without creative efforts shall fall within the protection scope of the present invention.

As shown in FIG. 1 to FIG. 10, as an embodiment of the present invention, a blowing-suction machine is provided and includes a blowing-suction machine body 1. The blowing-suction machine body 1 includes a handheld handle 2 and an air blowing-suction machine component 3, and an end portion of the handheld handle 2 is provided with a connecting assembly 4 connected to the air blowing-suction machine component 3. The air blowing-suction machine component 3 includes an air blowing-suction head assembly and a rotating bracket 31. A ball block 311 and a fixing rack 312 are disposed in the rotating bracket 31. The ball block 311 is internally provided with a plurality of clamping slots 3111. The air blowing-suction head assembly includes a motor cover 32 disposed on one side of the rotating bracket 31, and one side of the motor cover 32 is provided with a ball slot 322 and a motor cover toothed portion 321 connected to the rotating bracket 31. A spring 323 is mounted on the ball slot 322, and a ball 324 clamped in the clamping slot 3111 is disposed on the spring 323. According to the blowing-suction machine provided in the embodiment, rotary rotation of the motor cover 32 can be fixed through the fixing rack 312 disposed in the rotating bracket 31, and the motor cover 32 is clamped in the clamping slot 3111 through the ball 324 disposed on the spring 323 to be connected to the rotating bracket 31, so that an operator can operate the motor cover and the air blowing-suction head assembly to rotate integrally when pressing the fixing rack 312 to enable the motor cover 32 to rotate, thereby driving the ball 324 to squeeze the spring 323 and to rotate to the clamping slots 3111 at different positions on the ball block 311, thereby clamping the ball 324 in the clamping slots 3111 at different positions. Therefore, the air blowing-suction head assembly flexibly rotates, and more narrow or hard-to-reach corners can be cleaned, thereby expanding the cleaning range of the blowing-suction machine; an operation is convenient, thereby improving cleaning efficiency; and various cleaning scenarios can be adapted, thereby meeting diversified requirements of a user. The motor cover 32 is connected to the rotating bracket 31 through the motor cover toothed portion 321, and a connection is stable and tight, so that a gap between the motor cover 32 and the rotating bracket 31 is reduced, thereby avoiding swinging during use and improving a cleaning effect and user experience; and a structure is simple and is convenient to assemble, thereby improving production efficiency and reducing a production cost.

Figure 3:
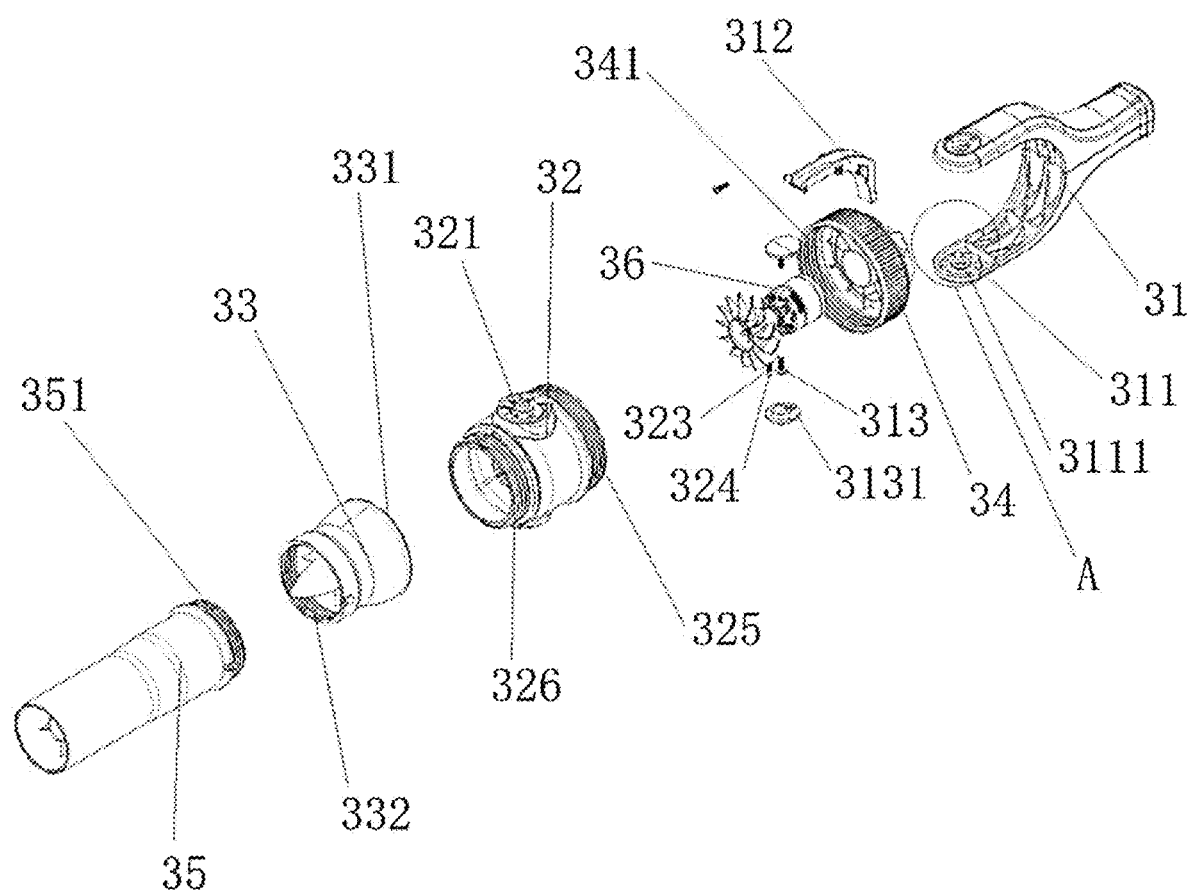
FIG. 3 is a schematic structural exploded view of an air blowing-suction machine component according to an embodiment of the present invention.
Figure 4:
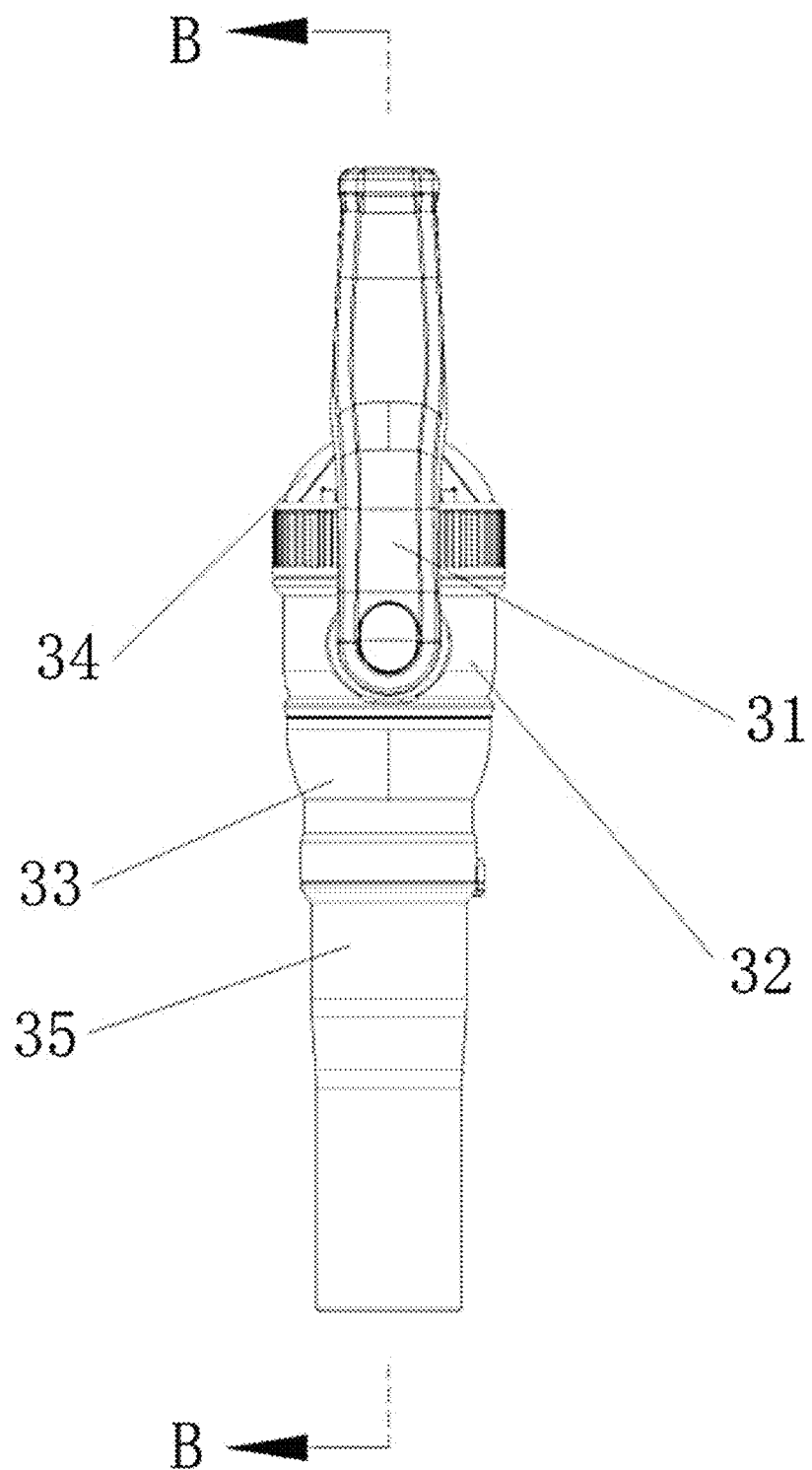
FIG. 4 is a schematic structural side view of an air blowing-suction machine component according to an embodiment of the present invention.

As shown in FIG. 3, in some specific embodiments, an air tube connecting member 33 is disposed on one side of the motor cover 32, and an air inlet cover 34 is disposed on the other side of the motor cover 32. Two ends of the motor cover 32 are provided with a first motor cover thread 325 and a second motor cover thread 326. The air inlet cover 34 is internally provided with an inner air inlet cover thread 341, and the first motor cover thread 325 is threadedly connected to the inner air inlet cover thread 341. Two ends of the air tube connecting member 33 are internally provided with a first inner air tube connecting member thread 331 and a second inner air tube connecting member thread 332, and the first inner air tube connecting member thread 331 is threadedly connected to the second motor cover thread 326. An air tube 35 is disposed on one side of the air tube connecting member 33, which is configured to blow air or suck air. The air tube 35 is provided with a first air tube thread 351, and the first air tube thread 351 is threadedly connected to the second inner air tube connecting member thread 332. In the embodiment, threaded connecting structures are adopted between the motor cover 32 and the air tube connecting member 33, between the motor cover 32 and the air inlet cover 34, and between the air tube 35 and the air tube connecting member 33 respectively, so that connections are tight and reliable, and mounting or detachment is convenient. In some other embodiments, a snap fit and other structures may be adopted for connection.

In some specific embodiments, a motor 36 is disposed in the motor cover 32, which is configured to drive the air blowing-suction head assembly to implement an air blowing or air suction function.

Figure 5:
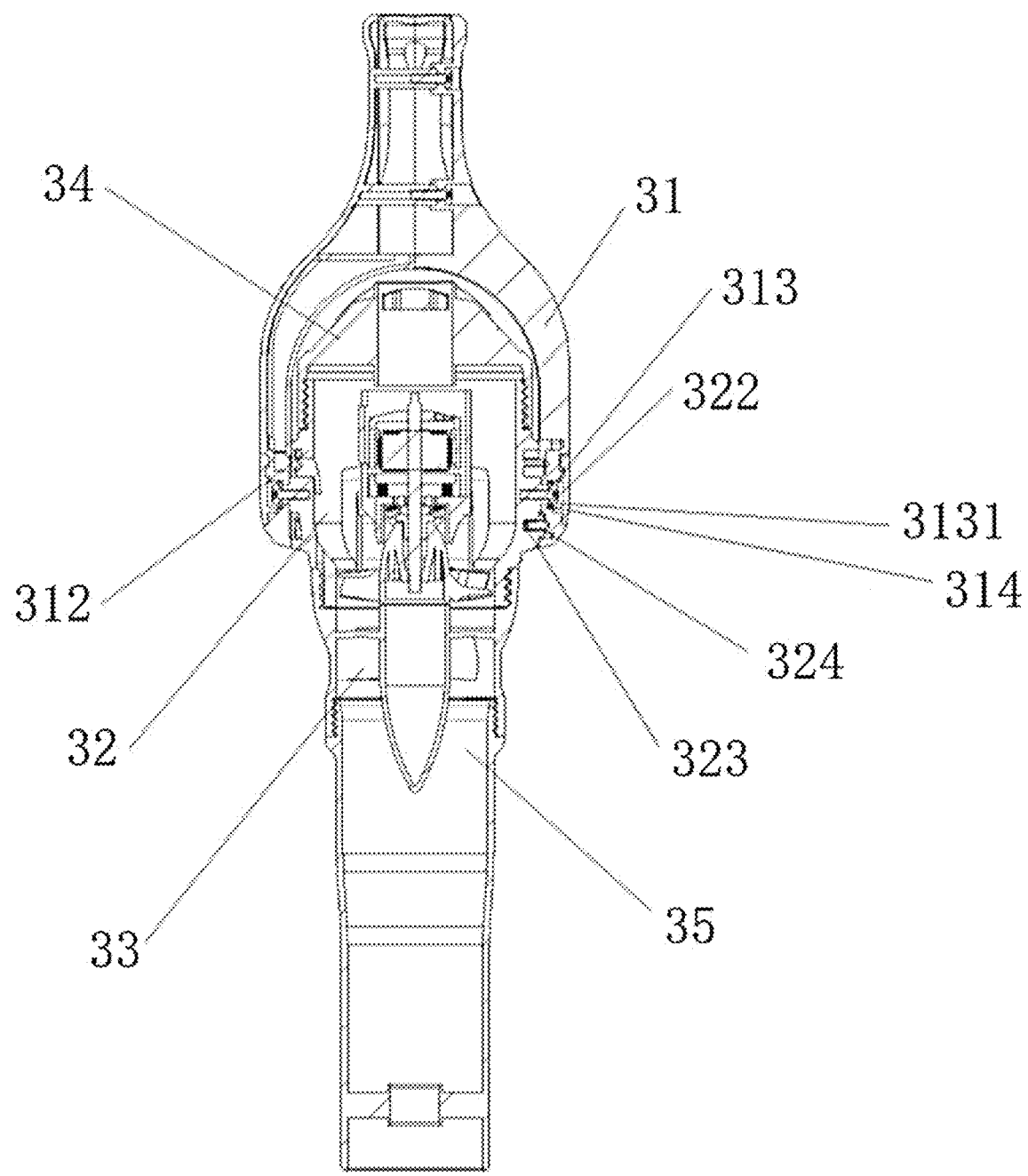
FIG. 5 is a schematic structural sectional view at B-B in FIG. 4.

As shown in FIG. 5, in some specific embodiments, a bolt 313 and a bearing 314 are disposed in the rotating bracket 31, and the motor cover 32 is rotatably connected to the rotating bracket 31 by using the bolt 313 to pass through the motor cover 32 and the bearing 314. Therefore, a structure is simple. An angle between the motor cover 32 and the rotating bracket 31 is adjusted by using the fixing rack 312 to fixedly clamp or loosen the motor cover 32. Therefore, an operation is simple and convenient, thereby facilitating quickly fixing or adjusting an angle of an air blowing-suction head. A cover cap 3131 is disposed at a top of the bolt 313, thereby facilitating operating the bolt 313 to implement connection or detachment between the motor cover 32 and the rotating bracket 31.

In some specific embodiments, one side of the rotating bracket 31 is connected to the motor cover toothed portion by using the bolt 313 to be inserted into the motor cover toothed portion 321, and an engaging portion matched with the motor cover toothed portion 321 is disposed on the rotating bracket 31, so that the rotating bracket 31 is connected to the motor cover 32 in an engaging manner through the motor cover toothed portion 321 and the engaging portion, and a connection is tight and reliable.

Figure 6:
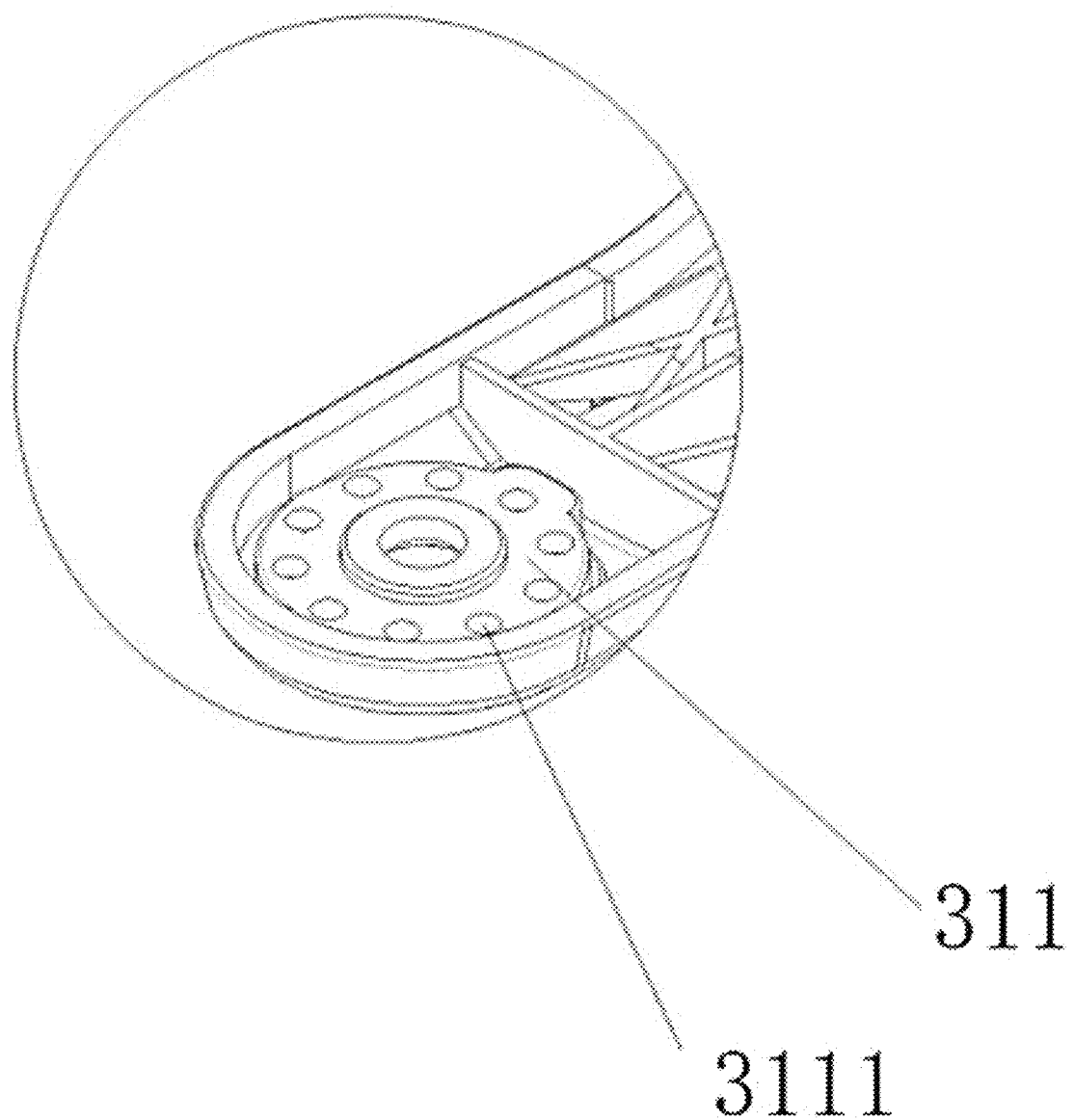
FIG. 6 is a schematic structural enlarged view of a position A in FIG. 3.
Figure 7:
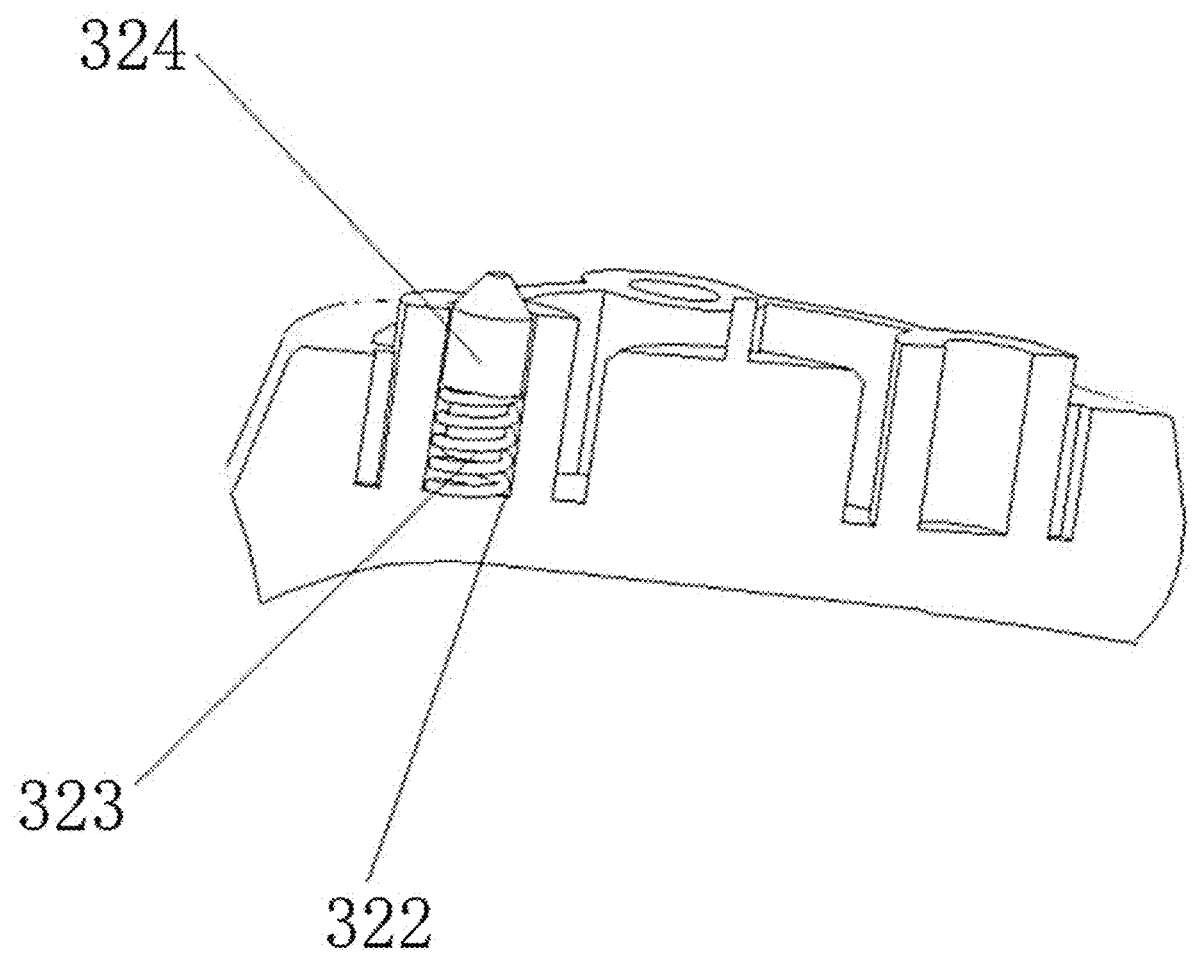
FIG. 7 is a schematic structural partial sectional view of a motor cover according to an embodiment of the present invention.

As shown in FIG. 6, in some specific embodiments, a quantity of the clamping slots 3111 is 10, and adjacent clamping slots 3111 are arranged at equal intervals along a circumferential direction, thereby facilitating positioning the motor cover 32 at a plurality of different angles relative to the rotating bracket 31. Optionally, a plurality of groups of ball slots 322, springs 323, and balls 324 that are arranged along the circumferential direction are disposed on one side of the motor cover 32. The balls 324 are correspondingly clamped on different clamping slots 3111 respectively. In addition, the balls 324 can be correspondingly clamped on different rotated clamping slots 3111 respectively after the motor cover and the air blowing-suction head assembly are operated to rotate integrally, thereby enabling the positioning of the motor cover 32 relative to the rotating bracket 31 to be more stable and reliable. In some other embodiments, the quantity of clamping slots 3111 may be one or another quantity.

Figure 8:
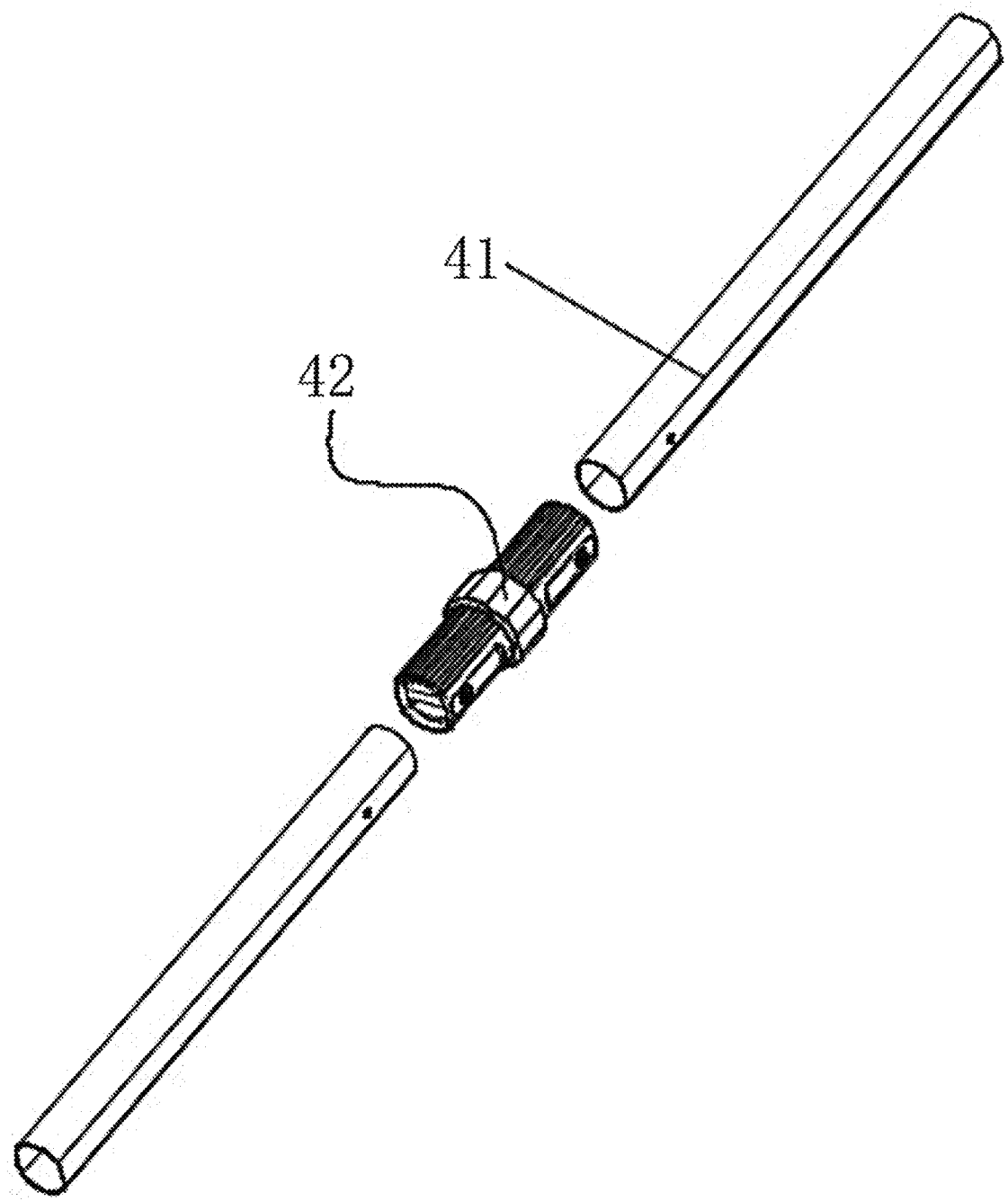
FIG. 8 is a schematic structural exploded view of a connecting assembly according to an embodiment of the present invention.

As shown in FIG. 8, in some specific embodiments, the connecting assembly 4 includes a connecting rod 41 and a connecting member 42. The connecting rod 41 adjusts a distance between the air blowing-suction machine component 3 and the handheld handle 2 through the connecting member 42. A structure is simple and facilitates production, accommodation, and transportation. In addition, the structure can be disposed to selectively lengthen or shorten an overall length of the connecting assembly 4 according to a height of the operator, which has a wide applicable range. The structure is convenient to detach and mount and is applicable to blowing and suction operations at high altitudes such as roofs. In addition, during use, the overall structure of the connecting assembly is stable and is not easy to swing, thereby improving practicability of the structure.

Figure 9:
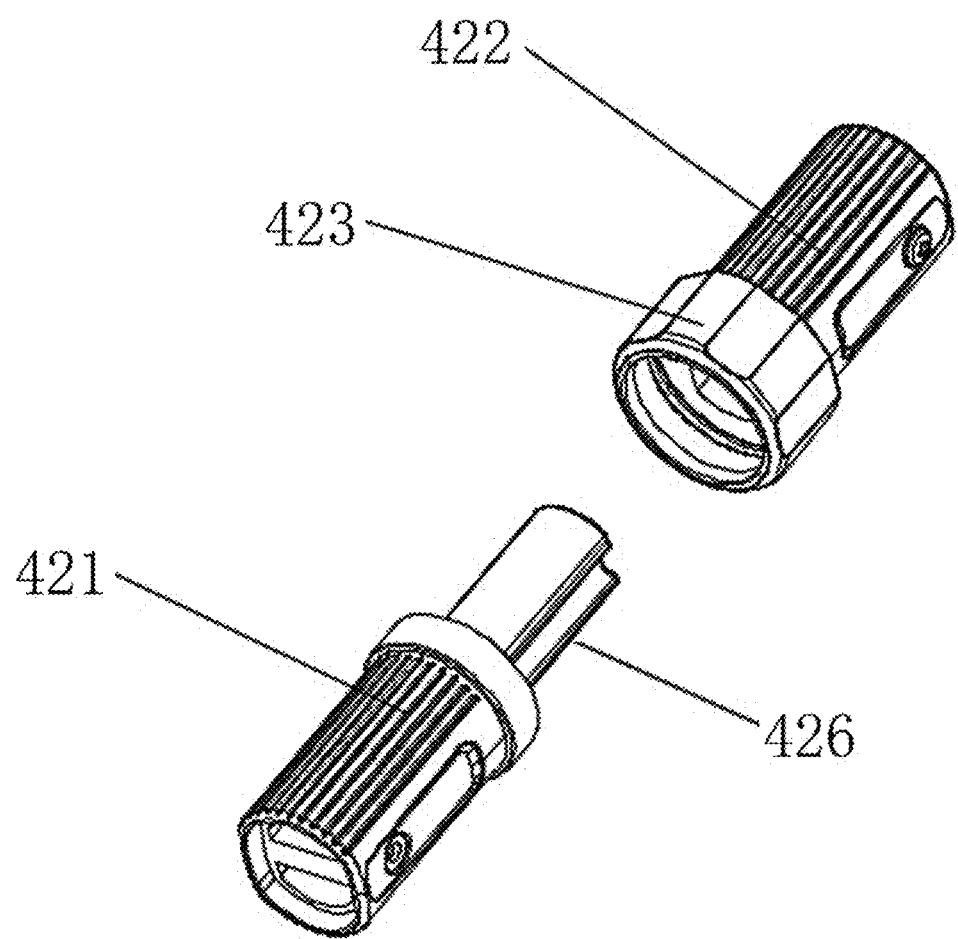
FIG. 9 is a schematic structural exploded view of a connecting member according to an embodiment of the present invention.

As shown in FIG. 1 and FIG. 9, in some specific embodiments, the connecting member 42 configured to lock, fix, and adjust two connecting rods 41 is disposed between the adjacent connecting rods 41, and the connecting member 42 can be configured to lengthen or shorten the connecting rod 41. The connecting member 42 includes a male end connector 421 and a female end connector 422. The male end connector 421 is connected to an end portion of one of the connecting rods 41 through a screw, and the female end connector 422 is connected to an end portion of the other adjacent connecting rod 41 through the screw. The male end connector 421 is connected to the female end connector 422 through a threaded sleeve 423. The male end connector 421 and the female end connector 422 only need to be connected to the two adjacent connecting rods 41 respectively, and then the male end connector 421 is fixed to the female end connector 422 through the threaded sleeve 423, so that quick detachment and mounting may be implemented, thereby improving use efficiency of the operator. The threaded sleeve 423 is disposed to fix the male end connector 421 to the female end connector 422 in a threaded screwing manner, and a connection is tight and stable. In addition, a nut may be added to lock the male end connector 421 with the female end connector 422, to prevent a loose connection.

Figure 10:
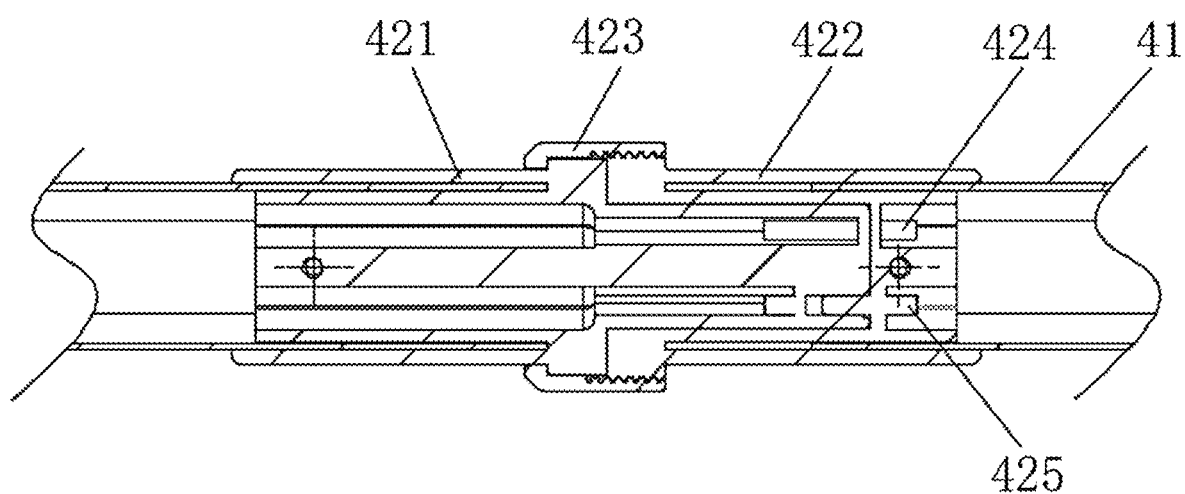
FIG. 10 is a schematic structural sectional view of a connecting assembly according to an embodiment of the present invention.

As shown in FIG. 10, in some specific embodiments, a male wire terminal 424 and a female wire terminal 425 that are communicated are disposed in the male end connector 421 and the female end connector 422 respectively. The male wire terminal 424 and the female wire terminal 425 are communicated to implement an electrical connection between conductor wires in the two adjacent connecting rods 41. The male wire terminal 424 is located above the female wire terminal 425.

As shown in FIG. 9, in some specific embodiments, a positioning structure is disposed between the male end connector 421 and the female end connector 422. The positioning structure includes a positioning block 426 and a positioning slot arranged corresponding to the positioning block 426. In the embodiment, the positioning block 426 is disposed on the male end connector 421, and the positioning slot is disposed on the female end connector 422, so that the male end connector 421 and the female end connector 422 are positioned through matching between the positioning block 426 and the positioning slot, to facilitate positioning during mounting and prevent a wrong mounting direction, thereby ensuring that the male wire terminal 424 can be accurately docked with the female wire terminal 425. Certainly, in some other embodiments, the positioning block 426 may also be disposed on the female end connector 422, and the positioning slot may also be disposed on the male end connector 421, so that the male end connector 421 and the female end connector 422 can also be positioned through matching between the positioning block 426 and the positioning slot.

In some specific embodiments, various electrical elements of the blowing-suction machine are all electrically connected to an external main controller, and the main controller may be a conventionally known device such as a computer that performs control.

The present invention further provides a method for using a blowing-suction machine for cleaning, adopting the blowing-suction machine provided by the present invention. The method includes the following steps: adjusting an angle of an air blowing-suction head assembly 3 through a rotary motor cover 32; selecting an air blowing mode or an air suction mode; and using the air blowing-suction head assembly 3 for cleaning. Since the method adopts the blowing-suction machine provided by the present invention, the method has beneficial effects such as a convenient operation, a wide cleaning range, high cleaning efficiency, and the like.

Finally, it should be noted that the above embodiments are only used to illustrate the technical solutions of the present invention rather than limiting thereto. Although the present invention has been described in detail with reference to the foregoing embodiments, those of ordinary skill in the art should understand that the technical solutions recited in the foregoing embodiments may still be modified, or some of the technical features thereof may be replaced with equivalents. These modifications or replacements do not make the essence of the corresponding technical solution deviate from the scope of the technical solutions in the embodiments of the present invention.

In conclusion, the foregoing descriptions are merely preferred embodiments of the present invention, and all equivalent changes and modifications made in accordance with the patent application scope of the present invention shall fall within the scope covered by the present invention.

What is claimed is:

1. A blowing-suction machine, comprising a blowing-suction machine body, wherein the blowing-suction machine body comprises a handheld handle and an air blowing-suction machine component, an end portion of the handheld handle is provided with a connecting assembly connected to the air blowing-suction machine component, the air blowing-suction machine component comprises an air blowing-suction head assembly and a rotating bracket, a ball block and a fixing rack are disposed in the rotating bracket, the ball block is internally provided with a plurality of clamping slots, the air blowing-suction head assembly comprises a motor cover disposed on one side of the rotating bracket, one side of the motor cover is provided with a ball slot and a motor cover toothed portion connected to the rotating bracket, a spring is mounted on the ball slot, and a ball clamped in the clamping slot is disposed on the spring.

2. The blowing-suction machine according to claim 1, wherein a motor is disposed in the motor cover, an air tube connecting member is disposed on one side of the motor cover, and an air inlet cover is disposed on the other side of the motor cover.

3. The blowing-suction machine according to claim 2, wherein two ends of the motor cover are provided with a first motor cover thread and a second motor cover thread, the air inlet cover is internally provided with an inner air inlet cover thread, the first motor cover thread is threadedly connected to the inner air inlet cover thread, two ends of the air tube connecting member are internally provided with a first inner air tube connecting member thread and a second inner air tube connecting member thread, and the first inner air tube connecting member thread is threadedly connected to the second motor cover thread.

4. The blowing-suction machine according to claim 3, wherein an air tube is disposed on one side of the air tube connecting member, the air tube is provided with a first air tube thread, and the first air tube thread is threadedly connected to the second inner air tube connecting member thread.

5. The blowing-suction machine according to claim 1, wherein one side of the rotating bracket is connected to the motor cover toothed portion by using a bolt to be inserted into the motor cover toothed portion.

6. The blowing-suction machine according to claim 1, wherein adjacent clamping slots are arranged at equal intervals along a circumferential direction.

7. The blowing-suction machine according to claim 1, wherein the connecting assembly comprises a connecting rod and a connecting member, the connecting member configured to lock, fix, and adjust two connecting rods is disposed between the adjacent connecting rods, and the connecting member can be configured to lengthen or shorten the connecting rod.

8. The blowing-suction machine according to claim 7, wherein the connecting member comprises a male end connector and a female end connector, the male end connector is connected to an end portion of one of the connecting rods through a screw, the female end connector is connected to an end portion of the other adjacent connecting rod through the screw, and a male wire terminal and a female wire terminal that are communicated are disposed in the male end connector and the female end connector respectively.

9. The blowing-suction machine according to claim 8, wherein the male end connector is connected to the female end connector through a threaded sleeve.

10. The blowing-suction machine according to claim 9, wherein a positioning structure is disposed between the male end connector and the female end connector, the positioning structure comprises a positioning block and a positioning slot arranged corresponding to the positioning block, one of the positioning block and the positioning slot is disposed on the male end connector, the other is disposed on the female end connector, and the male end connector and the female end connector are positioned through matching between the positioning block and the positioning slot.

11. A method for using a blowing-suction machine for cleaning, adopting the blowing-suction machine according to claim 1, wherein the method comprises the following steps:

adjusting an angle of an air blowing-suction head assembly through a rotary motor cover;
selecting an air blowing mode or an air suction mode; and
using the air blowing-suction head assembly for cleaning.

* * * * *